(No Model.)
J. F. WHEELER.
TOOTH HOLDER FOR CULTIVATORS.
No. 323,004.  Patented July 28, 1885.
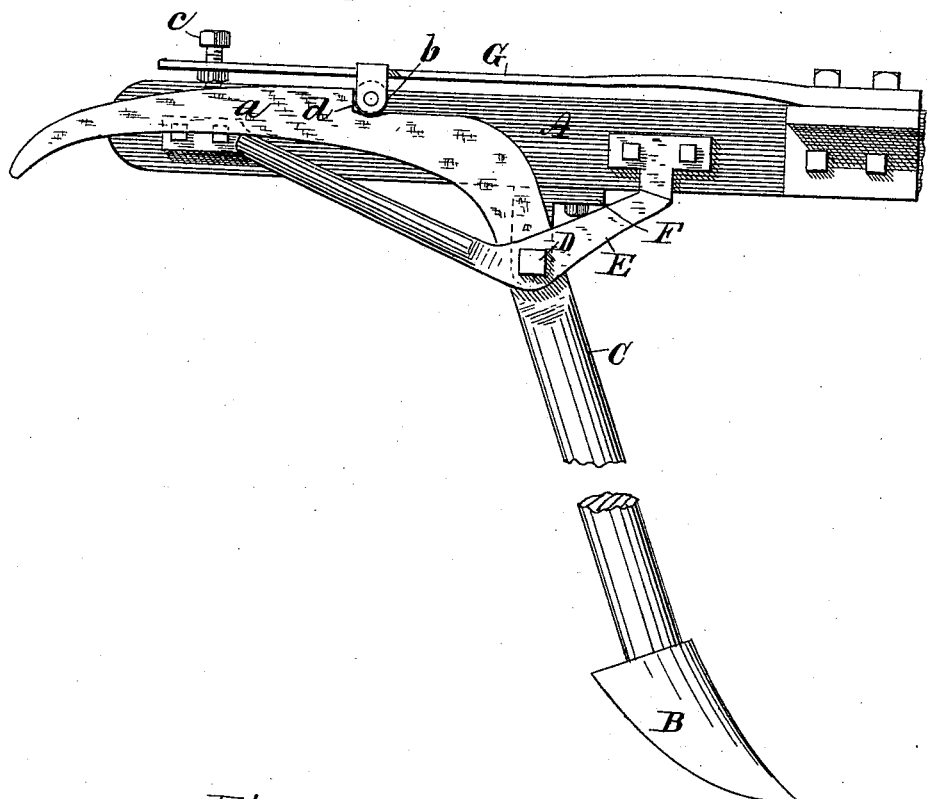
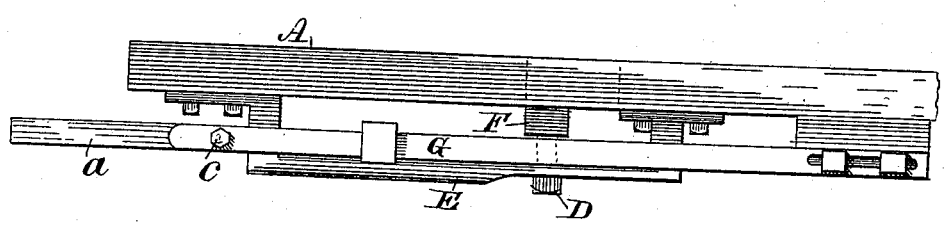
Witnesses
G. M. Gridley
Matthew Schinner
Joseph F. Wheeler
Inventor
By Emmet Peuschit
Attorneys

UNITED STATES PATENT OFFICE.

JOSEPH F. WHEELER, OF WYOCENA, WISCONSIN.

TOOTH-HOLDER FOR CULTIVATORS.

SPECIFICATION forming part of Letters Patent No. 323,004, dated July 28, 1885.

Application filed September 24, 1884. (No model.)

*To all whom it may concern:*

Be it known that I, JOSEPH F. WHEELER, a citizen of the United States, residing at Wyocena, in the county of Columbia and State of Wisconsin, have invented certain new and useful Improvements in Tooth-Holders for Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in devices for attaching the teeth of cultivators, seeders, &c., to their draw-bars, which improvements now made relate to the same kind of implements, and are in addition to those for which Letters Patent No. 301,545 were granted to me on July 8, 1884.

This invention has reference particularly to the adjustment of the plate-spring and its relation to and connection with the shank of the tooth.

In the accompanying drawings, Figure 1 is a side elevation showing my invention and the parts to which it relates. Fig. 2 is a top view of the same.

The same letters refer to like parts in both views.

A is the draw-bar of a cultivator. B is a cultivator-tooth. C is the shank to which, at its lower end, the tooth B is affixed, which shank is pivoted near its upper end to the draw-bar A. I preferably pivot it to the draw-bar indirectly by the bolt D, through the rigid bracket E and arm F, which bracket and arm are rigidly affixed to the draw-bar. In this manner I secure a longer arm above the pivot for use in connection with my plate-spring, hereinafter described. The upper part of the shank C terminates in the arm *a*, nearly at right angles with the main part of the shank, which arm, when the shank is attached to the draw-bar and is in the position it has when in use, extends rearwardly parallel with the draw-bar, as shown in Fig. 1. The plate-spring G at its front end is affixed to the draw-bar so as to extend rearwardly over the arm *a* of the shank, and is provided on its under side at a distance from its rear free end with a small anti-friction wheel, *b*, which wheel revolves freely within lugs or brackets affixed to said spring, and also with the bolt or set-screw *c*, which turns in said spring upon a thread cut in the spring or in a nut affixed to the spring, the free lower end of which rests upon and bears against the top of the arm *a*. In the upper surface of the arm *a* is a recess and shoulder, *d*, adapted to receive on its front side and engage the wheel *b* on the plate-spring G, and the upper surface of the arm *a* is preferably curved or inclined somewhat downwardly from the shoulder *d* toward its rear end.

When the cultivator is being used, the wheel *b* engages against shoulder *d* and holds the tooth B in position for stirring the ground as a plow, but if the tooth strikes an immovable obstruction and is thereby held from moving forward with the draw-bar, the forward movement of the draw-bar causes the spring G to bend upward, forward of the wheel *b*, until by the raising of the arm *a*, caused by the relatively-backward motion of the shank C, the wheel *b*, by the action of the arm *a* against the bolt *c*, is released from the shoulder *d*, and the shank and its tooth B move freely relatively backward and pass over the obstruction, when they can be again replaced in position for ordinary work, thereby obviating the liability of breaking the cultivator or of shock to the team that otherwise exists. The bolt *c*, by turning to the right or left, is caused to extend below the plate-spring more or less, whereby the wheel B is released from shoulder *d* more or less easily and quickly on the greater or less rising of the rear end of the arm *a*, as desired.

Heretofore I have used a plate-spring having a rigid shoulder adapted to engage the shoulder *d*, and without the nut *c*; but learning by experience that something more was required to adapt this style of implement for use under all circumstances, I have invented the improvements which I now claim, as follows:

1. The combination, with the draw-bar A, of the spring G, secured upon the top thereof, the anti-friction wheel b, attached to said spring, and the arm a of shank C, provided with shoulder d, substantially as described.

2. The shank C, attached to the draw-bar A by being pivoted below the bar in bracket E and arm F, both rigid to said bar and provided with arm a, having shoulder d, in combination with bar A and spring G, having anti-friction wheel b, as set forth.

In testimony whereof I affix my signature in presence of two witnesses.

JOSEPH F. WHEELER.

Witnesses:
JAS. B. ERWIN,
C. T. BENEDICT.